United States Patent [19]
Tanzer et al.

[11] Patent Number: 5,173,828
[45] Date of Patent: Dec. 22, 1992

[54] COMPACT MULTIPLE ROLLER TAPE GUIDE ASSEMBLY

[75] Inventors: Andrew E. Tanzer, Monument, Colo.; George Saliba; Edward L. Steltzer, Westboro, both of Mass.

[73] Assignee: Digital Equipment Corporation, Maynard, Mass.

[21] Appl. No.: 619,893

[22] Filed: Nov. 29, 1990

[51] Int. Cl.⁵ ............................................. G11B 15/60
[52] U.S. Cl. ............................................. 360/130.21
[58] Field of Search ............... 360/90, 95, 96.1–96.4, 360/130.2, 130.21; 226/185, 189–192; 242/195

[56] References Cited

U.S. PATENT DOCUMENTS

| | | | |
|---|---|---|---|
| 3,235,195 | 2/1966 | Hebb et al. | 360/132 |
| 3,695,553 | 10/1972 | Everett | 360/134 |
| 4,975,792 | 12/1990 | Renders | 360/93 |

OTHER PUBLICATIONS

Gilovich et al., "Thread/Load Arrangement for Capstan/Vacuum Column Tape Drive", IBM TDB, Jul. 1977, vol. 20, No. 2, pp. 764–765.

"Unrecorded Magnetic Tape Cartridge for Information Interchange—0.250 inch (6.30 mm), 6400–10,000 ftpi (252–394 ft pmm)", ANSI (1987) X3.127.

*Primary Examiner*—David J. Severin
*Attorney, Agent, or Firm*—Lahive & Cockfield

[57] ABSTRACT

A method and apparatus for constraining lateral motion of a tape streaming in a first direction across the transducing face of a magnetic head by provision of at least one arcuate portion of the tape travel path. This arcuate portion is defined by one set of at least three tape guide rollers on a first side of the head. A second set of at least three tape guide rollers may be provided to define a second arcuate portion of the tape guide path on a second side of the head for use when the tape is streaming in a second direction opposite to the first direction across the transducing face of the head.

14 Claims, 3 Drawing Sheets

COMPACT MULTIPLE ROLLER TAPE GUIDE ASSEMBLY

BACKGROUND OF THE INVENTION

The present invention relates generally to magnetic recording tape guide assemblies, and more particularly, to a compact tape guide assembly with reduced lateral tape motion.

Magnetic media are used for storage of data generated by computers. Typically a magnetic medium is presented to a magnetic head which ordinarily can either read or write data on the medium. Magnetic storage disks, commonly referred to as hard disks, are presently the preferred storage medium for use in computer systems where fast access time and substantial storage capacity are of interest. But because of their low cost, portability, compactness and adequate storage capacity, magnetic tapes are also used for data storage.

One advantage which tapes have over hard disks is that once the data is on a magnetic tape, the tape and its container (commonly referred to as a cartridge) can be removed from the computer and stored in a secure location or can be used for carrying or mailing data to a remote location. This removable feature allows tape and tape drives to be used as archival storage and/or "back-up" systems for hard disks. However, the data error rate must be quite low to allow use as archival and/or backup storage devices.

In order to increase storage density for a given cartridge size, thinner tape may be employed. Also, bits may be written on the tape in smaller areas and on a plurality of parallel longitudinal tracks. As more tracks are recorded on a tape, each track then becomes narrower and the tape must now be constrained from shifting up or down (called lateral tape motion) in a direction perpendicular to the tape travel path as the tape passes by the magnetic head, so as to maintain proper alignment of the head and tracks on the tape, thus to prevent data retrieval errors.

Lateral tape motion is defined as the peak-to-peak distance of the undesirable movement (in-plane) of the tape perpendicular to its prescribed longitudinal direction of motion past the head. Lateral tape motion is a major contributor to tape reading error, and must be limited to a fraction of the track width so that readback amplitude is not lost if a written track fails to line up substantially with the transducing portion of the head. As well, if the data portion of the tape puckers or is otherwise not essentially straight and planar and presented at uniform tension as the tape contacts the transducing portion of the head, then data retrieval errors are likely to result.

The tape is presented to the head by a tape guide assembly in a tape drive assembly. The tape guide assembly must be capable of repeatedly and accurately presenting the tape to the head despite some wear in the tape, tape cartridge or tape guide assembly, or variations in tape width and straightness, as well as allowing for idiosyncrasies between various members of a computer family where a tape may be recorded in one member of a family and played back in another member of the family.

It is therefore an object of the present invention to provide a tape guiding system which minimizes lateral tape motion.

It is another object of the present invention to provide a tape guiding system which minimizes lateral tape motion regardless of variations in the tape media, tape cartridge, or the tape drive assembly.

SUMMARY OF THE INVENTION

The present invention improves performance of magnetic storage tape by reducing readback errors caused by inadequate tape tracking within a tape guide assembly. Lateral tape motion is virtually eliminated in the present invention. The invention enables very high information storage density in a "5¼ inch" tape drive assembly.

An arcuate or curvilinear tape guide path, defined by a combination of small rollers, is employed to constrain the tape travel to a narrow window in front of the head. The greater edge control provided by the multiple roller arrangement virtually eliminates lateral tape motion. The multiple roller arrangement reduces the free path between neighboring rollers while increasing the overall tape path length. The shorter unsupported tape length between rollers also raises the natural frequency of transverse vibration of the tape segments between the rollers, thereby reducing the amplitude of instantaneous tension variations as a result of greater damping at the higher frequency.

The present invention thus provides repeatably accurate tracking for extremely high data and track densities. The multiple roller device allows tapes to run at their best and to be drive-interchangeable, with very little degradation caused by the drive. This is very important because tapes are frequently recorded in one drive and played back in a different drive. Furthermore, 0.5 mil recording tape requires the very gentle multiple-contact roller guiding provided by the present invention. Therefore, use of half-inch wide 0.5 mil recording tape in a "5¼ inch" tape drive assembly is enabled in practice of the present invention.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF THE PREFERRED EMBODIMENT

Figure 1:
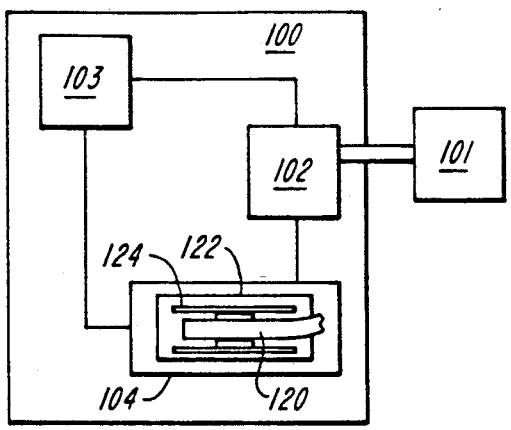
FIG. 1 is a schematic view of a prior art computer system.

Various computer types employ a tape drive assembly for transfer of data between a magnetic tape and the computer. As shown in FIG. 1, a computer 100 may include a display 101, a data processing section 102, a motor controller circuit 103, and a tape drive assembly 104. The tape drive assembly receives a tape 120 on a supply reel 124 in a cartridge 122.

Figure 2:
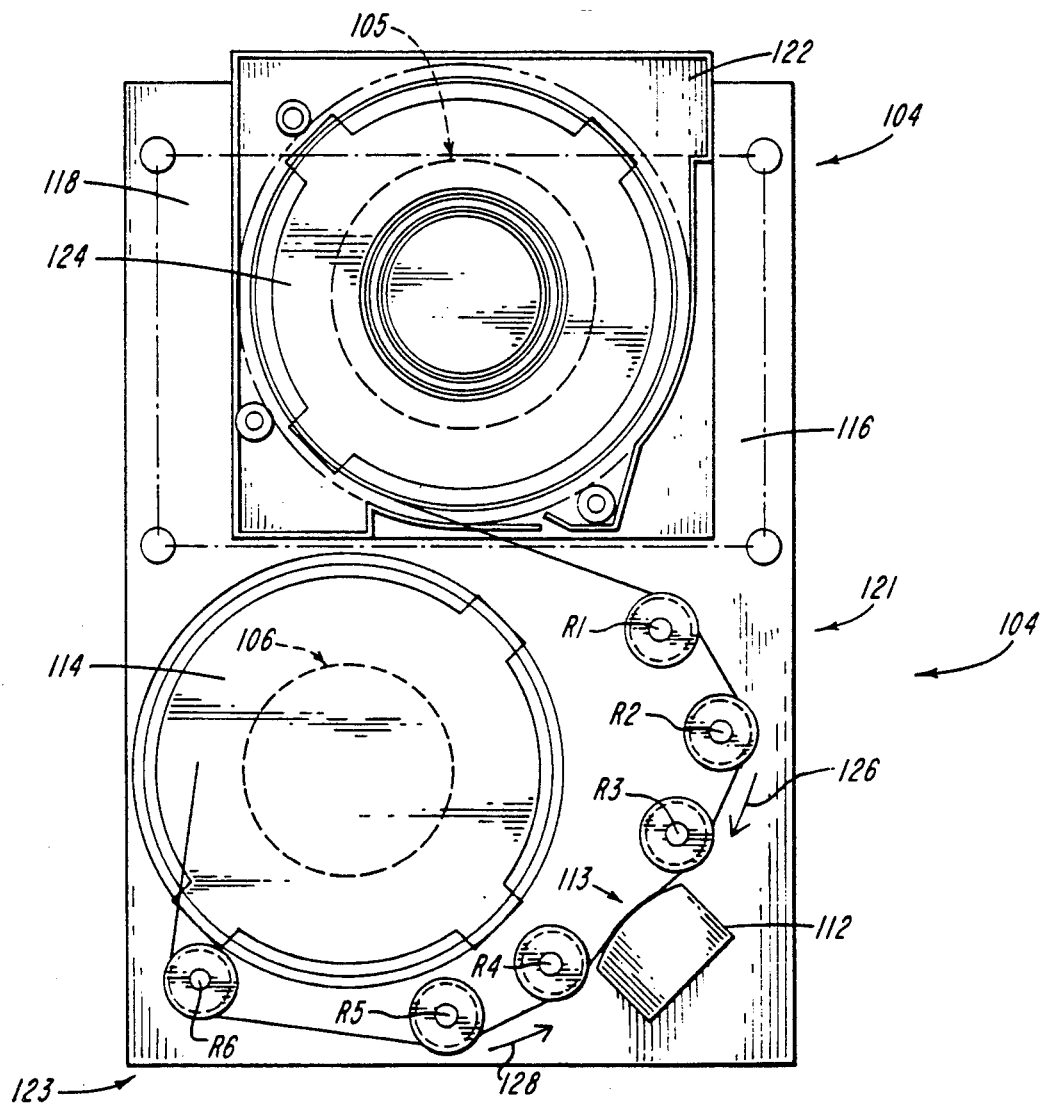
FIG. 2 is a plan view of a tape guide assembly in practice of the invention.

A preferred tape drive assembly 104 is shown in FIG. 2. Cartridge 122 is inserted into a receiver 116 of assembly 104. A motor 105 (shown in dotted outline) drives the cartridge supply reel 124. Motor 106 (shown in dotted outline) drives take-up reel 114. Proper balance of the opposing torques of the two motors produces the required tape tension and also produces tape motion either in or out of cartridge 122. Hence, the tape may be driven in either forward direction 126 or reverse direction 128 to variously write data on or read data from the tape in cooperation with the drive from motors 105, 106, as controlled by motor controller circuit 103 under the direction of processor 102. The tape is rewound back onto supply reel 124 before tape 120 in tape cartridge 122 is removed from tape drive assembly 104.

Figure 3:
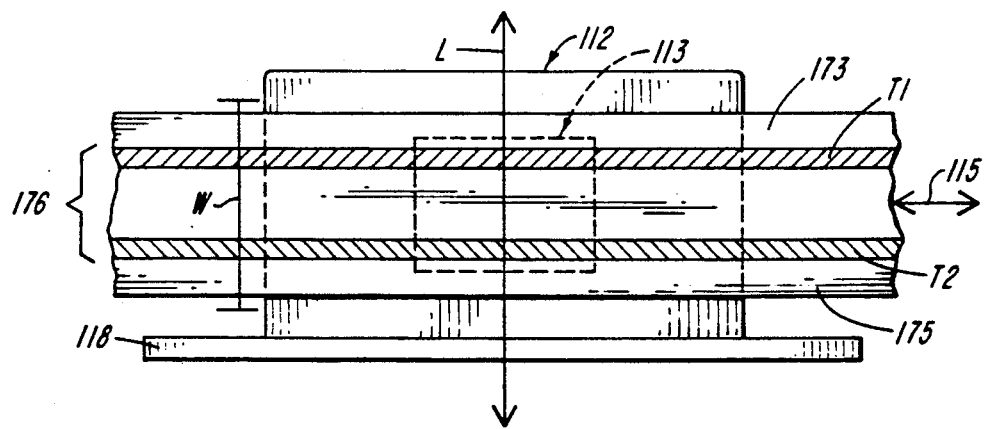
FIG. 3 is a side view of a recording tape travelling over the transducing portion of a head.

Head 112 is shown in FIG. 3 with tape 120 streaming across the head transducing face 113. The longitudinal tape travel path 115 is perpendicular to the lateral axis L of the head. Data is written in a plurality of parallel tracks (e.g., T1, T2) on data portion 176 of the tape. Data portion 176 lies between the tape's non-data portions 173, 175. The head 112 moves laterally up and down along axis L so as to read data on selected ones of these tracks. Therefore, the tape must always be presented across head face 113 in a very narrow window W (i.e., with minimal lateral variation, preferably less than about 10% of track width) so as to avoid misalignment of the head and the tracks as would result in data errors.

One popular tape drive assembly, known generally as a "$5\frac{1}{4}$ inch" tape drive, is typically $5\frac{3}{4}$ inches wide $\times 3\frac{1}{4}$ inches high $\times 9$ inches deep. This drive typically receives a "$5\frac{1}{4}$ inch" cartridge which is about 4.1 inches square and one inch high. Typically, six hundred feet of a half-inch wide, one mil thick tape is wound onto a 3.6 inch diameter supply reel in a $5\frac{1}{4}$ inch cartridge for data storage use in a $5\frac{1}{4}$ inch tape drive. The storage capacity of a $5\frac{1}{4}$ inch cartridge, however, can be increased by lengthening the tape. For example, approximately 1100 feet of 0.5 mil tape may be loaded onto the same supply reel. Therefore, more data may be stored in a $5\frac{1}{4}$ inch cartridge using 0.5 mil tape versus 1.0 mil tape.

The present invention is directed to solving problems arising from using such 0.5 mil tape. For example, a straight length of 0.5 mil tape is flimsy and difficult to maintain in a narrow, unwavering tape flow path. Hence, it is difficult to provide the 0.5 mil tape to the head in the tape drive precisely perpendicular to the head lateral axis L within window W. As well, tapes are not manufactured with perfect straightness, thickness and flatness. All of these irregularities make it difficult to present the tape uniformly across the tape head. Nevertheless, since compactness is a necessary feature of competitive computer systems, the present invention provides a tape guide assembly for use within the dimensions of a standard size $5\frac{1}{4}$ inch tape drive which solves these problems and yet receives a standard size $5\frac{1}{4}$ inch cartridge loaded with 0.5 mil tape.

Figure 4:
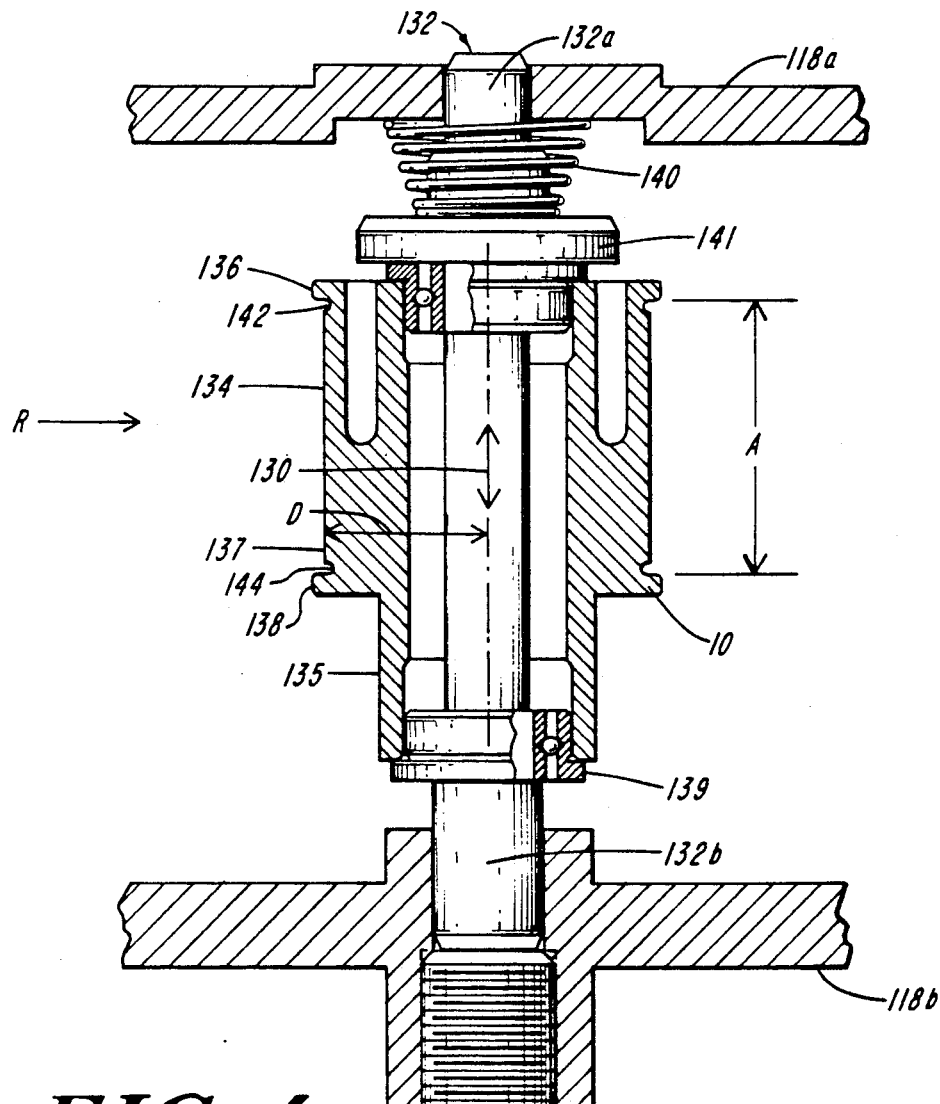
FIG. 4 is a side cross-sectional view of a roller in practice of the invention.

As seen in FIG. 2, tape guide assembly 104 includes six tape rollers R1-R6. Essentially each tape guide roller is a machined cylinder. An exemplary tape guide roller R is shown in the cross-sectional view of FIG. 4 mounted in frame elements 118a, 118b of housing 118 on a shaft 132. The roller includes a stem 135, a tape support surface 134, and flanges 136, 138. The tape support surface 134 is uniformly flat, extending parallel to the roller shaft axis 130, and preferably lies on the circumference of a 0.600 mil diameter D. A respective gutter 142, 144 is formed as a depression at the point where the tape support surface 134 meets respective flanges 136, 138. Gutters 142, 144 provide a sharp corner to control the tape at its edge portions 173, 175. The roller is mounted on a preloaded ball bearing 139 to prevent roller motion lateral to the tape. A small coil spring 140 and washer 141 are used to preload the roller and bearing assembly.

Referring again to FIG. 2, it should be appreciated that two sets of at least three tightly toleranced rollers (i.e., R1-R3 and R6-R4) are provided to constrain and guide the tape as it streams off of reel 114 or reel 124 and past the head. The benefit of such arrangement is set forth below.

While 0.5 mil tape is flimsy relative to lateral motion when held in a straight beam, it becomes relatively rigid to lateral motion (perpendicular to the tape longitudinal axis 115) when the tape is formed with an arc in the longitudinal axis. Therefore, a feature of the invention is location of each set of rollers (R1-R3 and R6-R4) along an arcuate or curvilinear guide path 121, 123 to force the tape into an arcuate or curvilinear (and thus laterally rigidized) longitudinal configuration. The lateral rigidizing of the tape enables the rollers to constrain lateral movement of the tape. Also, an additional benefit derives from this arcuate arrangement, mainly, that it enables placement of the rollers in a tight configuration such as permits its incorporation in a $5\frac{1}{4}$ inch tape drive assembly meeting the above stated dimensional limitations.

The distance between the rollers is also a significant factor in controlling lateral tape motion. To the extent that the tape can be thought of as a fairly rigid beam, a pair of adjacent rollers controls the position and angle of the beam, but if the distance in between the pair is too small, angular accuracy is lost. However, if the pair of adjacent rollers is too widely separated, the beam-like stiffness is lost, and the tape can deviate from straightness. Thus two rollers that are too close together (nearly adjacent) do not have much improvement over a single roller, but if the rollers are more than about four tape widths apart, then the tape is allowed too much free play, and tracking suffers. Preferred spacing of the rollers in the present invention averages 1.58 inches (approximately three tape widths), and varies only because of space constraints.

The rollers and flanges are preferably formed with the following dimensions, spacings and tolerances: the roller body is 0.600 inches in diameter, the flange separation is nominally 0.0008 inches larger than the mean tape width, and the separation tolerance is $+/-0.00025$ inches.

Roller R6 also serves as a tachometer roller, as described in copending application U.S. Ser. No. 620,465, entitled "Non-Slip Tachometer Roller", by Keith Loren Daly, assigned to the same assignee, and filed contemporaneously herewith, the contents of which are incorporated herein by reference.

The forward traveling tape (i.e., in direction 126) unspooling from supply reel 124 is guided along arcuate tape path 121 to the head, constrained from lateral motion essentially by action of flanged rollers R1-R3 on the supply reel side of head 112, and flanged roller R4 on the take-up reel side of the head. The reverse traveling tape (i.e., in direction 128) unspooling from take-up reel 114 is constrained and guided over arcuate path 123 by flanged rollers R6-R4 and then roller R3. The arcuate path 121 or 123 forces tape 120 into an arcuate or curvilinear longitudinal configuration which rigidizes the tape so that the constraining action of the roller flanges forces the tape to remain within window W as it passes in front of the head.

It has been observed that relatively thin and slick tape (e.g., 0.5 mil tape) does not stack uniformly as it spools onto a supply or take-up reel. Therefore, such tape may unspool obliquely to the roller longitudinal axis. In practice of the present invention, the tape is desired to travel along tape path 115 perpendicular to the head lateral axis L at the head, even if the tape unspooling from the supply reel or take-up reel intersects the longitudinal axis of outside roller R1 or R6 at an oblique angle. Hence, when the tape unspools from reel 114 (or 124) at an oblique angle to the roller longitudinal axis 130 at roller R1 (or R6), the tape is laterally constrained by the flanges 136, 138 of roller R1 (or R6) and is presented to roller R2 (or R5) at a lesser angle. The tape is next presented by roller R2 (or R5) to the next roller R3 (or R4) at a yet lesser angle, where it is further constrained to a yet lesser angle so as to be able to stream across head face 113 to roller R4 (or R3) constrained within window W (as specified above). To some degree, the amount of constraint inparted by each of rollers R1-R3 or R6-R4 is additive because the tape is held in an arcuate path 121, 123, thus making use of the local rigidization characteristic that local longitudinal bending of the tape supplies.

Figure 5:
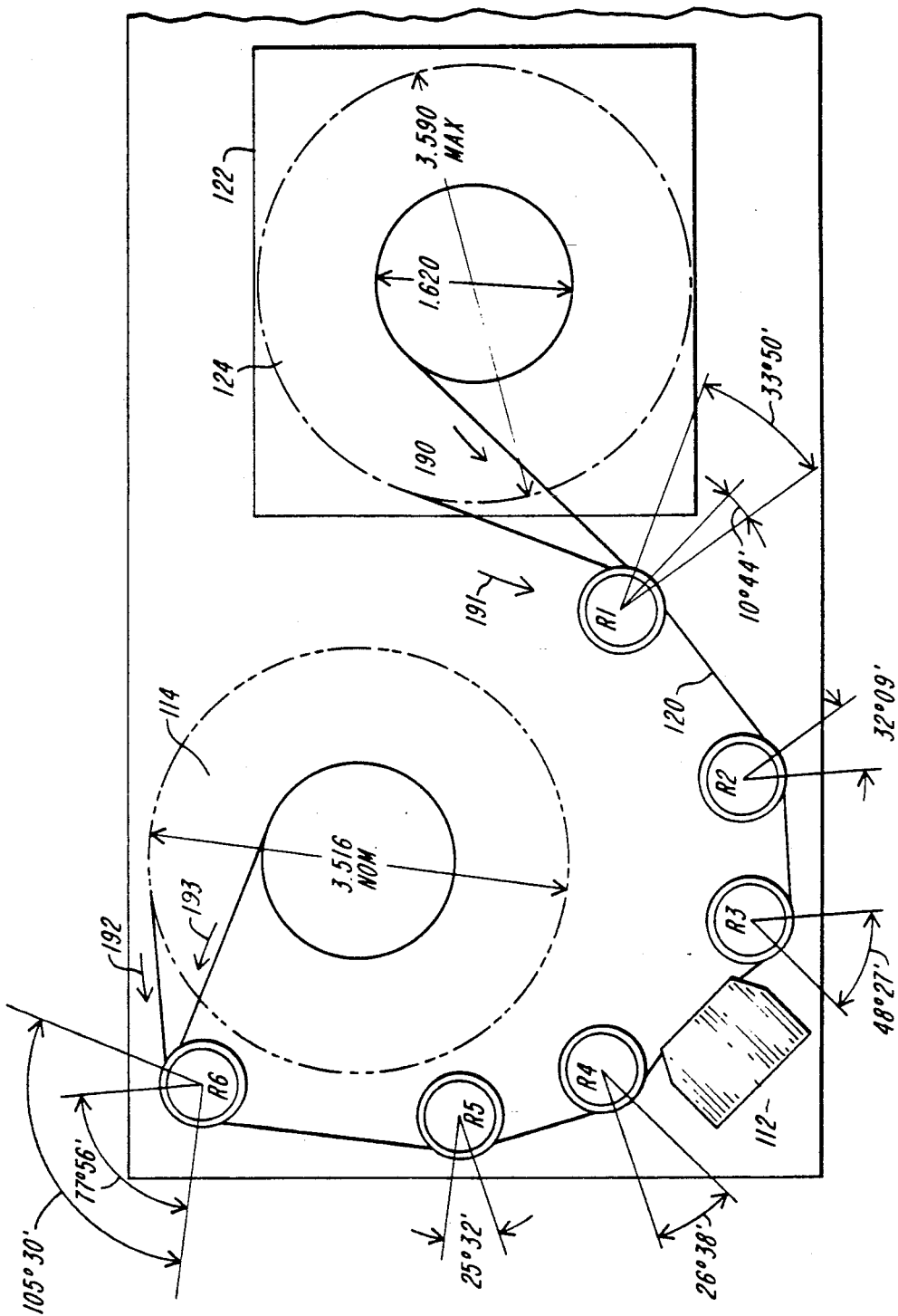
FIG. 5 is a plan view of a preferred tape guide assembly in practice of the invention.

The angular contact of tape 120 with respective rollers R1-R6 in an illustrative embodiment is shown in FIG. 5. When the tape is fully unwound from supply reel 124, the tape follows path 190 and attacks roller R1 at an angle of approximately eleven degrees, and at the same time the tape in path 192 attacks roller R6 over about 78 degrees of its surface as it loads onto the full take-up reel 114. Similarly, tape path 193 on the unloaded take-up reel 114 captures approximately 105° of tach roller R6 with a corresponding tape path 191 of the loaded supply reel 124 attacking approximately 34° of the surface of the R1 roller. The angular contact for each of rollers R2-R5 is approximately 32, 48, 27, and 26 degrees, respectively. (Roller R6 also serves as a tachometer roller. To assure its optimal performance, a substantial amount of the surface of roller R6 is forced into the tape travel path, as shown.)

The multiple roller magnetic tape transport system described herein has demonstrated high storage capabilities per cartridge and enables repeated writing and reading in very narrow tracks. Storage capacity of this magnitude is not presently available. The rollers limit lateral tape motion, while each roller exerts only a small lateral force on the tape so as not to damage or wear the tape edges. The present tape guide assembly has a negligible lateral shift when switching between forward and backward travel. Also, and equally important, the interchangeability of tapes from drive to drive incorporating the invention allows for system flexibility. A user may record data on any tape drive assembly and read it back on any other tape drive assembly in a family, including transporting tapes between locations. If good tracking were not available, high reliability readback would require readback on the same drive used to record the tape.

It will now be understood that the present invention provides a multiplicity of flanged rollers which urge the tape into a prescribed tape travel path. Although the flanges of the rollers do not exert much force on the edges of the tape, they and their positioning are nevertheless the essential means of guiding the tape, as assisted by the tape supporting surfaces of the rollers themselves. This system is considered to be passive, since there are not any active moving parts to adjust the tape position or the tape head position. In an active tape guiding system, tape position is determined and, through a feedback mechanism, the tape head is moved laterally so as to perfect the tape-to-head positional relationship. In an alternative embodiment of the invention, the presently disclosed passive guiding system is augmented with an active system which senses tape position and moves the head accordingly to further reduce tape-to-head positional error.

It will be understood that the above description pertains to only several embodiments of the present invention. That is, the description is provided by way of illustration and not by way of limitation. The invention, therefore, is to be defined according to the following claims.

What is claimed is:

1. A tape guide assembly for presentation of a magnetic tape along a tape travel path from a first side of a magnetic head to a second side of the head in contact with an intermediate transducing face of the head and transverse to a lateral axis of the head, the tape spooling between a respective supply reel and take-up reel, the assembly comprising means for reducing lateral motion of the tape at the transducing face of the head, said means having a set of rotatable rollers mounted on a frame in an arcuate tape travel path which runs essentially perpendicular to the head lateral axis, the set of rollers including a flanged reel roller for positioning adjacent to one of the reels, a flanged head roller adjacent to the head and a flanged intermediate roller between the reel roller and the head roller, wherein travel of a magnetic tape perpendicular to the lateral axis of the head is very substantially limited as the tape spools between supply reel and take-up reel.

2. The assembly of claim 1 wherein the head roller is on one of the sides of the head and further comprising a second flanged head roller on the other side of the head.

3. The assembly of claim 1 further comprising
a second set of rotatable rollers mounted on the frame in a second arcuate tape travel path essentially perpendicular to the head lateral axis, the second set of rollers including a second flanged reel roller for positioning adjacent to a second one of the reels, a second flanged head roller adjacent to the head and a second flanged intermediate roller between the second reel roller and the second head roller.

4. The assembly of claim 3 wherein the arcuate tape travel path is on one side of the head and the second arcuate tape travel path is located on the other side of the head.

5. The assembly of claim 1 wherein the spacing between the intermediate roller and each of its adjacent rollers is between about three to four times the tape width.

6. The assembly of claim 5 wherein each roller comprises a tape support surface of diameter D, where D is approximately equal to the tape width.

7. The assembly of claim 1 wherein each of the rollers comprises a cylinder extending along a respective longitudinal axis essentially parallel to the head lateral axis and having a roller face for contact with the tape, the face extending between two flanges.

8. The assembly of claim 3 wherein the tape has a mean width of approximately 0.5 inches and the flange separation is nominally about 0.0008 inches larger than the mean tape width.

9. The assembly of claim 3 wherein a respective gutter is formed as a depression at the point where the tape support surface meets a respective flange to provide a sharp corner to control the tape at its edge portions.

10. A tape drive assembly for guiding magnetic tape in a tape travel path generally perpendicular to the lateral axis of a magnetic head for presentation of the tape from a first side of the head to a second side of the head in contact with an intermediate transducing face of the head as the tape spools between a supply reel at a supply reel location on the supply side of the head and a take-up reel at a take-up reel location on the take-up side of the head, the assembly comprising a first set of flanged rotatable rollers mounted on a frame in a first arcuate tape travel path essentially perpendicular to the head lateral axis and located between the head supply side and the supply reel location, and a second set of flanged rotatable rollers mounted on the frame in a second arcuate tape travel path perpendicular to the lateral axis and located between the head take-up side and the take-up reel location, wherein travel of a magnetic tape perpendicular to the lateral axis of the head is very substantially limited as the tape spools between supply reel and take-up reel location.

11. The assembly of claim 10 wherein the spacing between each intermediate roller and each of its adjacent rollers is between about three to four times the tape width.

12. A method of presenting a recording tape to a magnetic head with the tape constrained from excess lateral movement perpendicular to tracks recorded on the tape as the tape streams across the front of the head, for rendering the tape interchangeable between various tape drives of interest for repeatably accurate tracking at high data and track densities, the method comprising the step of providing in each tape drive of interest an arcuate tape travel path across a set of at least three flanged and rotating rollers on one side of the head, and providing at least one flanged and rotating roller on the other side of the head for receipt of the tape from the set of rollers on the one side of the head, with travel of the tape perpendicular to the lateral axis of the head being very substantially limited as the tape spools between supply reel and take-up reel.

13. The method of claim 12 wherein the tape is nominally 0.5 mil thick and is stored in a 5¼ inch tape cartridge.

14. The method of claim 13 wherein the tape is nominally ½" wide.

* * * * *